United States Patent [19]

Akio et al.

[11] 4,254,634
[45] Mar. 10, 1981

[54] CONTROL VALVE TO BE EMPLOYED FOR REFRIGERATOR AND AIR CONDITIONER

[75] Inventors: Ohno Akio, Tokyo; Tamura Yuichi, Kawasaki, both of Japan

[73] Assignee: Fuji Koki Manufacturing Oc., Ltd., Tokyo, Japan

[21] Appl. No.: 859,473

[22] Filed: Dec. 12, 1977

[30] Foreign Application Priority Data

| Dec. 12, 1976 [JP] | Japan | 51-166856[U] |
| Dec. 13, 1976 [JP] | Japan | 51-149518 |
| Dec. 13, 1976 [JP] | Japan | 51-166855[U] |
| Jun. 2, 1977 [JP] | Japan | 52-64011 |

[51] Int. Cl.³ .............................................. F25B 4/04
[52] U.S. Cl. .................................. 62/217; 62/222; 137/220; 137/221; 137/489.5
[58] Field of Search ................... 137/220, 221, 454.2, 137/489.5, 491, 468; 62/217, 222

[56] References Cited

U.S. PATENT DOCUMENTS

| 2,523,826 | 9/1950 | Heinzelmen | 137/489.5 X |
| 3,296,816 | 1/1967 | Weibel | 62/217 X |
| 3,702,066 | 11/1972 | Beatenborugh | 62/222 |
| 3,810,488 | 5/1974 | Orth | 62/217 X |
| 3,819,041 | 6/1965 | Hansen | 62/217 X |
| 3,962,884 | 6/1976 | Widdowson | 62/217 |

Primary Examiner—Alan Cohan
Attorney, Agent, or Firm—Depaoli & O'Brien

[57] ABSTRACT

A fluid flow passage is available, between an inlet tube and an outlet tube, through a piston supported by a spring and equipped with an orifice connecting a pilot chamber and the outlet tube. A bellows chamber or a diaphragm chamber is provided with a pilot valve, which is directly connected with the bellows or the diaphragm, to open or close an orifice connecting the bellows chamber or the diaphragm chamber and a pilot chamber in which the piston is placed, in response to the pressure in the inlet tube monitored by the bellows or the diaphragm. The inlet tube and the outlet tube, together with the valve body, are formed by pressing or drawing at either end of a single tube which contains the valve means under the perfect airtight condition, to form a control valve to be employed for refrigerator and air conditioner.

25 Claims, 4 Drawing Figures 4,254,634

CONTROL VALVE TO BE EMPLOYED FOR REFRIGERATOR AND AIR CONDITIONER

BACKGROUND OF THE INVENTION

This invention relates to a control valve, including a pressure control valve to be employed for refrigerator and air conditioner, an evaporation temperature control valve and etc. A control valve of the prior art, for example a pressure control valve, consisting of a valve proper, an inlet coupling and an outlet coupling, employs some means, such as O rings or welding, for keeping parts such as valve means under the airtight position. Further, control means is exposed to outside. Therefore, many kinds of parts are necessary, causing a failure requiring many steps in assembly. Further, since there are many parameters causing unsatisfactory airtight position, observed is a tendency to be readily influenced by the ambient pressure.

SUMMARY OF THE INVENTION

This invention is aimed at providing a control valve to be employed for refrigerator and air conditioner, eliminating failures inherently unavoidable in cases of control valves of the prior art.

A general object of this invention is to provide a control valve comprising, in combination, a tube which is fabricated by pressing or drawing to form a cartridged and airtight valve body together with outlet and inlet couplings after being assembled with a valve means and a valve means, which is to be cartridged in the above tube, comprising a pressure monitor and a valve to work in response to the pressure monitored by the above mentioned pressure monitor.

Another object of this invention is to provide a pressure control valve comprising, in combination, a tube to be fabricated by pressing or drawing to form a valve body together with outlet and inlet tubes after being assembled with a valve means, which is of a cartridge construction, comprising a pressure monitor having a diaphragm of which the internal pressure is kept in constant by means of containing inert gas in the diaphragm or by utilizing a spring for monitoring the outlet pressure of evaporator and a valve means for control of the flow of refrigerant by opening or closing a valve in response to the outlet pressure of evaporator monitored by the pressure monitor mentioned above.

A further object of this invention is to provide a pressure control valve comprising, in combination, a tube to be fabricated by pressing or drawing to form a valve body together with outlet and inlet tubes after being assembled with a valve means, which is of a cartridge construction, provided with an evaporation temperature monitor having a diaphragm in which active gas is contained and a valve means for control of the flow of refrigerant by means of valve action in response to the change in pressure of the active gas monitored by observing the evaporation temperature of the active gas.

The present invention will be explained more particularly with reference to the accompanying drawings where:

DETAILED DESCRIPTION OF THE INVENTION

Figure 1:
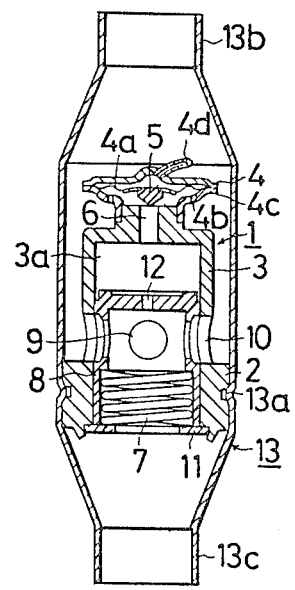
FIG. 1 is a cross-sectional view of a control valve comprising, in combination, a diaphragm containing inert gas and a pilot valve directly connecting with the diaphragm.

Firstly, explanation will be made for the case shown in FIG. 1. A valve proper (1), being placed on top of a fitting base (2) with a short cylindrical shape, constitutes, as one body, a seat (3) with a cylindrical shape which constitutes a pilot chamber ( 3a). A monitor means (4) is placed on top of the seat (3).

The upper chamber of the monitor means (4) divided by a diaphragm (4a) contains inert gas, supplied through a capillary tube (4d), of which the internal pressure is kept at a constant. The capillary tube (4d) is sealed by pinching afterwards to keep the diaphragm (4a) airtight. A pilot valve (5) directly connected with the diaphragm (4a) has a function to open or close an orifice (6) of the pilot chamber (3a). The monitor means (4) is connected with the inlet tube, to be discussed later, through a pressure equalizing hole (4b) of a diaphragm chamber (4c). The seat (3) is provided with a piston (8) equipped with a spring (7). The piston (8) is allowed to shift along the seat (3). Further, the piston (8) is provided with a hole (9) through which the inside of the piston (8) is connected to a tubular fluid flow passage (10).

The spring (7) is placed along the internal surface of the skirt of the piston (8). The spring (7) is placed between a washer fitted to the fitting base (2) by calking and a stage portion formed at the upper portion of the skirt mentioned above.

An orifice (12) is placed on top of the piston (8). The valve proper (1) capable of the valve activities as discussed above is, as one body, inserted to a tube (13) before being fitted with the fitting base (2) by means of spinning (13a) and being fabricated to form the inlet tube (13b) and outlet tube (13c) by means of pressing or drawing.

The activities of the control valve, discussed above, to be utilized as an evaporation pressure control valve will be explained below. When the evaporation pressure is applied at the lower surface of diaphragm of the monitor means (4) through the inlet tube (13b) and the pressure equalizing hole (4b), the pressure applied at the lower surface of the diaphragm is equal to the pressure of inlet tube (13b), so that the orifice (6) is not closed by the pilot (5). Thus, when the orifice (6) is open, the pressure in the pilot chamber (3a) inside the seat (3) is equal to the pressure of inlet tube (13b), so that the piston (8), being pushed downward by the pressure, stays at the lower end to keep the hole (9) at the open position. As a result, refrigerant is allowed to flow into a compressor through the outlet tube (13).

However, should the pressure of inlet tube (13b) become less than a specific value, the pressure applied at the lower surface of the diaphragm of the monitor means (4) also becomes less than a specific value, since the pressure is identical to that in inlet tube (13b) through the pressure equalizing hole (4b). Thus, the inert gas pressure applied above the diaphragm (4a) pushes the diaphragm (4a) downward to make the pilot valve (5) to close the orifice (6). Therefore, being sucked by a compressor, the pressure in the pilot chamber (3a) reduces.

Then, once the pressure in the pilot chamber (3a) reduces below the pressure of the spring (7), the spring (7) pushes the piston (8) upward. When the piston (8) is pushed upward, the piston hole (9) is covered by the piston wall, resulting in closure of the fluid flow passage through the tubular fluid flow passage (10). When the tubular fluid flow passage (10) is closed, the pressure in inlet tube (13b) increases again.

Should the pressure in inlet tube (13b) increase beyond a specific value, the diaphragm (4a) is pushed upward by the pressure passing through the pressure equalizing hole (4b). As a result, the pilot valve (5) opens the orifice (6) to increase the pressure in the pilot chamber (3a), which pushes the piston (8) downward against thrust of the spring (7), causing the relative position of the tubular fluid flow passage (10) and the hole (9) to make an opening condition. Therefore, subject to existence of a satisfactory refrigerant pressure in the inlet tube (13b), the fluid flow passage returns to a full opening position to keep the evaporation pressure at or above a specific value.

A pressure control valve of the prior art, utilizing a spring, controls the pressure of an evaporator by means of adjusting thrust of the spring. Accordingly, this requires many kinds of parts and causes a failure that the influence of the ambient pressure is unavoidable.

This embodiment is provided with a monitor means having a diaphragm containing inert gas to keep the diaphragm internal pressure at a constant rather than having a spring, and monitoring the pressure of evaporator at the opposite surface of the diaphragm, it controls the flow of refrigerant by opening and closing of a valve in response to balance of the pressure.

Accordingly, available is a pressure control valve of which the control pressure is adjustable by means of adjusting the pressure of inert gas contained in the diaphragm, of which the kinds of parts are fairly limited and which is hardly influenced by the ambient pressure.

In any case, since the control valve is formed by fabrication of a tube (13), after being inserted with a cartridged valve means comprising a monitor means having a diaphragm and a valve operating in response to the monitor means, no possibility is observed for an unsatisfactory airtight condition, less kinds of parts are required and less steps are required in assembly. Further, since the valve means is inserted, as one body, in the tube, observed is another feature that the ambient pressure hardly be effective to the accuracy of control. An easy fabrication is feasible for the cartridged control valve by utilizing aluminum for the seat, piston, washer and tube.

Figure 2:
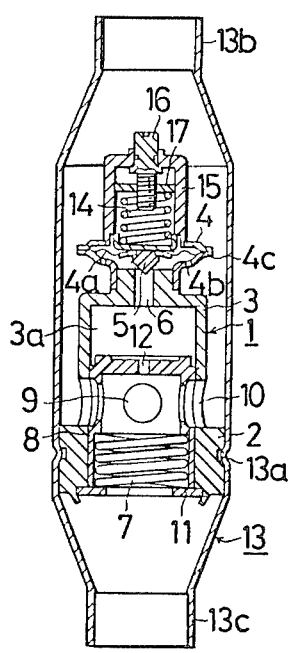
FIGS. 2 and 3 are cross-sectional views of control valves comprising, in combination, a diaphragm utilizing a spring rather than inert gas contained in it.

Secondly, the embodiment shown in FIG. 2 is completely identical to that shown in FIG. 1 except for the construction of monitor means. In other words, a spring (14) rather than inert gas is utilized for the diaphragm. A spring chamber (15) is placed on top of the diaphragm chamber. An adjusting spring (14) is placed between a supporter of the diaphragm (4a) and a supporter of the spring (17) movable upward and downward by means of an adjusting screw (16) screwed on top of the spring chamber (15). In the case shown in FIG. 2, an O ring is provided between the adjusting screw (16) and the spring chamber (15) to prohibit the refrigerant pressure from being brought into the spring chamber (15). The operation of this device is identical to that shown in FIG. 1 excepting the adjustment is to be made with a spring rather than the pressure of gas contained in a diaphragm.

Figure 3:
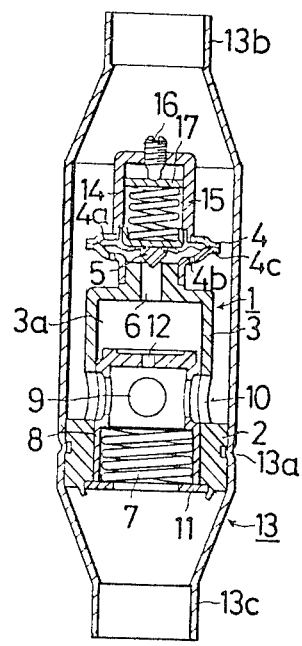

Thirdly, the embodiment shown in FIG. 3 utilizes an adjusting spring as does in the case of FIG. 2. This embodiment is, however, provided with an adjusting screw (16) screwed directly on the spring chamber (15) rather than on the supporter of spring (17) as in the case of FIG. 2 and with a screw (16) of which the lower end is supported on the supporter of spring (17). In this case, a binding agent or solder is applied between the outer surface of spring cylinder (15) and the adjusting screw (16) to prohibit the refrigerant pressure from being brought into the spring chamber (15).

Although the explanation is made on the assumption that the monitor means is made of a diaphragm for the above embodiments, the identical effects can be expected for the cases where the monitor means are made of bellows. An evaporation temperature control valve can also be formed in the similar manner.

Figure 4:
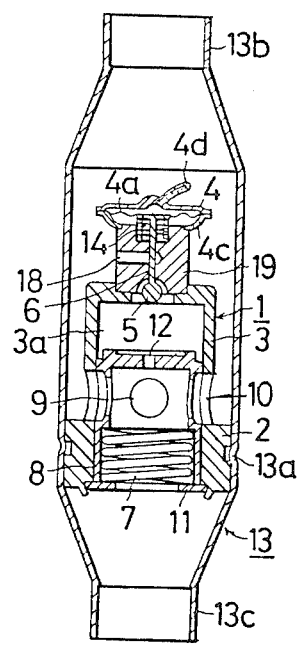
FIG. 4 is a cross-sectional view of a control valve utilizing a pilot valve different from the shown in FIG. 1.

Fourthly, the embodiment shown in FIG. 4 relates to the evaporation temperature control valve provided with a spring (14) between a supporter of diaphragm (4c) and a diaphragm (4a) provided with a pilot valve (5) directly connected with the diaphragm (4a) by means of a rod. The supporter of diaphragm (4c) is fitted on a seat (3) through a valve seat (19) provided with an orifice (6) which is opened or closed by means of the pilot valve (5). The orifice (6) is connected with an inlet tube (13b) through an inlet channel (18) of the valve seat (19). Active gas is contained in an upper chamber of the diaphragm of the monitor means. A capillary tube used for supply of active gas is pinched thereafter for keeping airtight for the diaphragm. Except for the mentioned above, no difference is observed for construction of this embodiment from that shown in FIG. 1. Accordingly, the same marks are given for the equivalent portions.

Explained below is the operation of the control valve:

When the evaporation temperature is at a specific value, a pilot valve (5) opens an orifice (6), as shown in FIG. 4. Under this condition, the pressure in a pilot chamber (3a) is identical to that in an inlet tube (13b), causing a piston (8) to stay at the lower end. Since a hole (9) of the piston (8) is kept at the opening position, refrigerant is sucked by a compressor through an outlet tube (13c).

However, should the evaporation temperature of the refrigerant become low in the inlet tube (13b), the pressure of the active gas becomes also low, causing the pilot valve (5) to be raised by the thrust of a spring (14) to close the orifice (6). As a result, the pressure of the pilot chamber (3a) reduces, being sucked by a compressor. Then, a spring (7) pushes the piston (8) upward against the downward thrust of the piston, causing the hole (9) of the piston (8) to be covered by the piston wall to close a fluid flow passage passing through the tubular fluid flow passage. Thus, once the tubular fluid flow passage is closed and the pressure and temperature of the refrigerant rises in the inlet tube (13b), the active gas swells to increase the pressure and opens the pilot valve (5) against the thrust of spring (14). When the pilot valve (5) opens, the internal pressure of a pilot chamber (3a) increases to push the piston (8) downward against thrust of the spring (7), making an opening condition for the relative position of the tubular fluid flow passage (10) and the hole (9). Thus, subject to the refrigerant temperature in the inlet tube (13b) beyond a specific value, the fluid flow passage (10) returns to a full opening position to enable the evaporation temperature to stay at or above a specific value.

An evaporation temperature control valve of the prior art, monitoring temperature by means of a bimetal etc., controls the evaporation pressure to keep within a specific range, causing a high production cost and slow response speed.

This embodiment, however, controls the evaporation temperature directly by means of the valve operation in response to the change in pressure of active gas, causing excellence in the control performance, advantage in production cost and swiftness in response speed.

As is clear from the explanation with reference to FIGS. 1 through 4, the present invention relates to a cartridged control valve manufactured by means of fabrication of a tube to form a valve body together with outlet and inlet tubes after being assembled with a valve means, which is of a cartridge construction, comprising a monitor means, a pilot valve, a piston and etc. Since the control valve proper forms one body with the means for access to outside such as inlet and outlet tubes, no possibility can be assumed for an unsatisfactory airtight position. Further, since the control valve proper is assembled in a tube, being completely isolated from the ambient, it can hardly be influenced by the ambient pressure. In addition, since the control valve requires a less kinds of parts, it requires a less steps in assembly.

What is claimed is:

1. A cartridged control valve, comprising, in combination, a fitting base with a short cylindrical shape, a seat with a cylindrical shape as one body on top of said fitting base, a piston which is movably disposed within said seat and said fitting base, a monitor means placed on top of said seat, said seat being provided with a seat orifice and a pilot chamber between said seat orifice and said piston and said monitor means comprising a diaphragm supporter, a diaphragm dividing said diaphragm supporter into an upper chamber and a diaphragm chamber, and a pilot valve, directly connected with said diaphragm and housed in said pilot chamber, to open or close said seat orifice, and a tube to be fabricated, by spinning to be applied along a circle around said fitting base, for sealably separating an inlet tube from an outlet tube and for forming a body of said control valve together with said inlet tube and outlet tube after being assembled with said fitting base, said seat, said piston, and said monitor means.

2. A cartridged control valve of claim 1, wherein said upper chamber contains an inert gas and said diaphragm chamber is provided with a pressure equalizing hole through said diaphragm supporter to provide pressure communication with said inlet tube, whereby said monitor means monitors the evaporation pressure inside said inlet tube.

3. A cartridged control valve of claim 1, further comprising, in combination, a piston spring which is mounted within said piston, a spring cylinder connecting with an upper portion of said diaphragm chamber, a spring supporter movable in the axial direction of said tube by means of an adjusting screw screwed on said spring supporter and inserted into the inlet end of said spring cylinder, an adjusting spring placed between said spring supporter and said diaphragm, and a pressure equalizing hole, made in said diaphragm supporter, for connecting said inlet tube to said diaphragm chamber.

4. A cartridged control valve of claim 3, provided with an O ring placed between said adjusting screw and said spring cylinder to prevent the passage of refrigerant pressure from entering into said spring cylinder.

5. A cartridged control valve or claim 1, comprising, in combination, a piston spring which is mounted within said piston, said seat orifice being on top of said seat to connect said diaphragm chamber with said inlet tube and the inside of said piston through a piston orifice and a hole in said piston, a spring cylinder connecting with an upper portion of said diaphragm chamber, a spring supporter for an adjusting spring supporting the lower end of an adjusting screw screwed on said spring cylinder, said adjusting spring being placed between said supporter for said adjusting spring and a supporter for said diaphragm, and a pressure equalizing hole, made in said diaphragm supporter, for connecting said diaphragm chamber to said inlet tube.

6. A cartridged control valve of claim 5, wherein a binding agent or solder is applied between said adjusting screw and the external surface of said spring cylinder to prevent the passage of refrigerant from entering into said spring cylinder.

7. The cartridged control valve of claim 1 wherein said valve further comprises:
A. said seat which:
  (1) is sealably attached to said fitting base,
  (2) has a smaller exterior cross-sectional area than the interior cross-sectional area of said tube to provide a flow space therebetween,
  (3) has at least one fluid flow passage connecting said flow space to said pilot chamber, and
  (4) has said seat orifice which is in flow communication with said inlet tube;
B. said piston which comprises:
  (1) an open outlet end in flow communication with said outlet tube,
  (2) at least one hole which is adapted to coincide with said at least one fluid flow passage when said piston slides toward said outlet tube, and
  (3) a piston orifice providing communication between said pilot chamber and said open outlet end;
C. a piston spring which is mounted within said open outlet end for urging said piston toward said inlet tube; and
D. said monitor means, comprising a temperature-sensitive means for monitoring the evaporator pressure within said body, which is attached to said seat.

8. The cartridged control valve of claim 7 wherein said temperature-sensitive means comprises a diaphragm supporter and a diaphragm dividing said diaphragm supporter into an upper chamber and a diaphragm chamber and wherein said pilot valve is attached to said diaphragm for selectively closing said seat orifice.

9. The cartridged control valve of claim 8 wherein said upper chamber is closed and contains an active gas.

10. The cartridged control valve of claim 8 wherein said upper chamber is connected to a spring chamber containing an adjusting spring.

11. The cartridged control valve of claim 10 wherein said adjusting spring contacts a diaphragm cup at one end and a spring supporter at its other end, said spring supporter being selectively axially movable by means of an adjusting screw.

12. The cartridged control valve of claim 9 wherein a valve seat is attached to said seat and to said diaphragm supporter, said valve seat comprising:
A. a pilot channel connecting said seat orifice with said diaphragm chamber;

B. an inlet channel providing communication between said evaporator pressure and said pilot channel;

C. said pilot valve, comprising:
  (1) a rod, which is attached at one end to said diaphragm and which is adapted for slideably moving within said pilot channel, and
  (2) a closure member which is attached to the other end of said rod and is adapted to close said seat orifice when said diaphragm moves toward said inlet tube; and D. an adjusting spring which biasses said diaphragm toward said inlet tube.

13. A cartridged control valve comprising:
a pipe having an inlet tube and outlet tube both of which are fabricated by drawing and through which a refrigerant flows;
a cartridge construction provided in the pipe; and
a spinning for connecting the cartridge construction to the pipe in air-tight fashion,
said cartridged construction being assembled by a piston provided with a hole for communicating said inlet tube to said outlet tube; an upper chamber filled with a gas for monitoring the pressure in said inlet tube and provided with a diaphragm which moves according to a change in temperature or pressure of the refrigerant or the gas; a seat defining a pilot chamber therein provided on one side of said piston and having an orifice communicating with the hole of the piston; and a pilot valve operated in accordance with the movement of said diaphragm for opening or closing said pilot chamber.

14. A cartridged control valve of claim 13, comprising, in combination, a fitting base with a short cylindrical shape, a seat with a cylindrical shape as one body on the inlet end of said fitting base, within which said piston spring and said piston are mounted, said seat orifice being in the inlet end of said seat to connect said diaphragm chamber with a tubular fluid flow passage in said seat and the inside of said piston through a hole in said piston, an upper chamber, formed by dividing said monitor means with said diaphragm, containing active gas, an adjusting spring placed between a diaphragm supporter and said diaphragm, and a pilot valve, directly connected with said diaphragm by means of a rod, to open or close said seat orifice connecting said diaphragm chamber and said inlet tube.

15. A cartridged control valve of claim 14, wherein said monitor means monitors the evaporation pressure within said inlet tube.

16. A cartridged control valve of claim 15, said piston spring being placed along the internal surface of a skirt portion of said piston between a washer calked below said fitting base and a stage portion formed at the upper portion of said skirt portion.

17. The cartridged control valve of claim 13 which further comprises:

A. a monitor means which comprises said diaphragm;
B. as said seat, a cup-shaped member, to which said monitor means is attached, comprising said orifice in the disc portion thereof, which is in flow communication with said inlet tube and is selectively opened and closed by said pilot valve, and flow passages in the cylindrical portion thereof, which are in flow communication with said inlet tube; and
C. in said piston:
  (1) a head which is provided with said hole;
  (2) a skirt, attached to the perimeter of said head, which is provided with holes adapted for coinciding with said flow passages, and
  (3) an open end in flow communication with said outlet tube,
said piston being slideably moveable within said cup-shaped member to define said pilot chamber, disposed between said disc portion and said head, to which said orifice and said hole are connected.

18. The cartridged control valve of claim 17, wherein:
A. said cup-shaped member further comprises a fitting base which is attached to the outlet edge of said cylindrical portion;
B. said fitting base comprises a circular recess which is adapted to receive said spinning; and
C. said cylindrical portion is spaced from the interior surface of said pipe to define a flow space therebetween.

19. The cartridged control valve of claim 18, wherein said monitor means is a pressure monitor.

20. The cartridged control valve of claim 18, wherein said monitor means comprises an inert gas sealed in a chamber adjacent to a diaphragm which is connected to said pilot valve.

21. The cartridged control valve of claim 18, wherein said monitor means comprises a spring which is disposed within a sealed spring chamber.

22. The cartridged control valve of claim 18, wherein said monitor means comprises a bellows which is disposed within a sealed chamber.

23. The cartridged control valve of claim 18, wherein said monitor means is a temperature monitor.

24. The cartridged control valve of claim 23, wherein said monitor means comprises an active gas sealed in a chamber adjacent to said diaphragm which is connected to said pilot valve, said active gas being sensitive to temperature changes of a refrigerant entering said inlet tube.

25. The cartridged control valve of claim 24, wherein said diaphragm is biased by a spring toward seating said valve body.

* * * * *